US 7,015,796 B2

(12) United States Patent
Snyder

(10) Patent No.: US 7,015,796 B2
(45) Date of Patent: Mar. 21, 2006

(54) DEVICE FOR WEANING AN ADDICTION

(75) Inventor: John B. Snyder, Indiatlantic, FL (US)

(73) Assignee: Brady Development, Inc., Avon, CT (US)

( * ) Notice: Subject to any disclaimer, the term of this patent is extended or adjusted under 35 U.S.C. 154(b) by 603 days.

(21) Appl. No.: 10/236,675

(22) Filed: Sep. 6, 2002

(65) Prior Publication Data

US 2004/0201480 A1 Oct. 14, 2004

(51) Int. Cl.
*G08B 1/00* (2006.01)

(52) U.S. Cl. ................. 340/309.16; 131/270; 131/328; 368/10; 340/309.15

(58) Field of Classification Search .......... 340/309.15, 340/309.16; 131/270, 328; 368/10
See application file for complete search history.

(56) References Cited

U.S. PATENT DOCUMENTS

| | | | |
|---|---|---|---|
| 4,111,448 A | 9/1978 | Sklodowsky | |
| 4,246,913 A | 1/1981 | Ogden et al. ............ | 131/171 A |
| 4,853,854 A | 8/1989 | Behar et al. | |
| 5,198,230 A | 3/1993 | Wen ........................... | 424/525 |
| 5,203,472 A | 4/1993 | ILevenbaum et al. ......... | 221/15 |
| 5,423,039 A * | 6/1995 | Matteson .................... | 718/107 |
| 5,554,967 A * | 9/1996 | Cook et al. .............. | 340/309.7 |
| 6,125,082 A * | 9/2000 | Reid ........................... | 368/10 |
| 6,606,997 B1 * | 8/2003 | Brue ........................ | 131/270 |
| 2002/0114223 A1 | 8/2002 | Perlman et al. | |
| 2004/0001001 A1 | 1/2004 | Perlman et al. | |

OTHER PUBLICATIONS

International Preliminary Examination Report of International Application No. PCT/US03/27884 filed Sep. 5, 2003.
"Medical Doctor Invents Computerized Wristwatch To Help Smokers Quit and Maintain Long-Term Smoking Cessation," nichenews website, 3 pages (printed Feb. 10, 2004).
www.Lifesign website, including pages concerning Adult smokers (3 sheets), Pregnant Smokers (4 sheets), and Teen smokers (3 sheets), all printed on Dec. 9, 2002.
Quitsmoking.com: "Habit Regulator Electronic Smoking Control Aid" INTERNET, Online, Jun. 9, 2002, XP002277584, Retrived from the Internet:<URL:http://web.archive.org/web/ 20020609133147/ http:// www.quitsmoking.com/habit/index.htm>, Apr. 21, 2004.
International Search Report.

* cited by examiner

Primary Examiner—Daryl C. Pope
(74) Attorney, Agent, or Firm—Darby & Darby

(57) ABSTRACT

A device for weaning an addiction includes a housing, an indicator, a processor, and an actuator. The processor is configured to deliver a state signal to the indicator under control of an algorithm. The state indicates either an armed state or a wait state. The actuator is supported by the housing and is communicatively coupled to the processor. In response to actuation of the actuator, the algorithm delivers the state signal indicative of the wait state until the timing signal satisfies a threshold value. If actuated after the timing signal satisfies the threshold value, the algorithm delivers the state signal indicative of the armed state and increases the threshold value. A method for weaning an addiction such as a smoking habit includes the steps of providing a device as above, enabling the user to seek permission from the device, and selectively indicating permissions to the user.

20 Claims, 3 Drawing Sheets

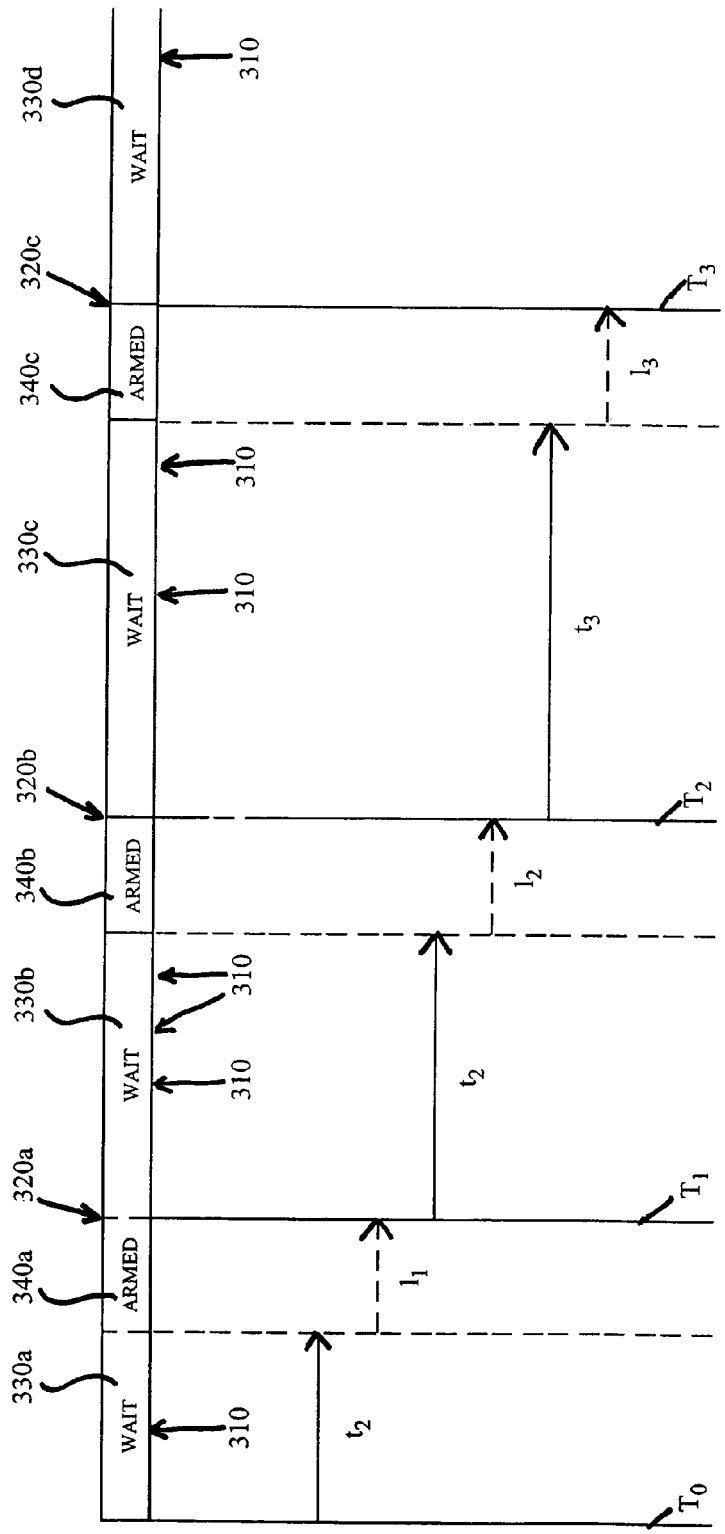

DEVICE FOR WEANING AN ADDICTION

FIELD OF THE INVENTION

The present invention relates generally to weaning an addiction, and, more particularly, to an electronic device for progressively lengthening wait intervals between permissions to engage in the addictive habit.

BACKGROUND OF THE INVENTION

Unfortunately, some habits such as smoking are addictive and persons have difficulty breaking those habits. Many methods are known to assist in breaking habits, and these include quitting "cold turkey," group counseling, medications (see U.S. Pat. No. 5,198,230), hypnosis and other aids. Many of these methods fail for a variety of reasons such as difficulty in following the regimen, demands on time, and cost. Nicotine patches, for example, are attendant with difficult regimens, side effects, and cost.

Thus, there is a need for a device to help persons wean an addiction which is simple to use, easy to carry and which gradually reduces the level of addiction over a period of time.

SUMMARY OF THE INVENTION

In accordance with one aspect of the invention, a device for weaning an addiction is described. The device includes a housing, an indicator, a processor, and an actuator. The processor is configured to deliver a state signal to the indicator under control of an algorithm. The state indicates either an armed state or a wait state. The actuator is supported by the housing and is communicatively coupled to the processor. In response to actuation of the actuator, the algorithm delivers the state signal indicative of the wait state until the timing signal satisfies a threshold value. If actuated after the timing signal satisfies the threshold value, the algorithm delivers the state signal indicative of the armed state and increases the threshold value. Preferably, the timing signal is reset.

In one preferred form, the housing is cylindrical and has the appearance of a cigarette.

In a particularly preferred arrangement, the threshold value tested by the algorithm is increased by a predetermined amount with actuations that are made while the timing signal satisfies the threshold value. The increases in threshold value preferably have a compounding effect on the magnitude of the timing signal necessary to deliver the state signal indicative of the armed state.

In accordance with a further aspect of the invention, a method for weaning an addiction such as a smoking habit is described. This method includes the steps of providing an electronic governor, enabling the user to seek permission from the governor by manually activating an activator associated with the governor, and selectively indicating permission to the user. Permissions are indicated if the interval since the last indicated permission exceeds a compoundingly increased interval between the permissions granted to the user. The governor includes an algorithm that provides such compoundingly increased intervals.

These and other aspects, features and advantages can be appreciated from the accompanying Drawing Figures and the Detailed Description that follows.

BRIEF DESCRIPTION OF DRAWINGS

FIG. 3 is a timing and state diagram which illustrates the algorithm of the preferred embodiment.

DETAILED DESCRIPTION

By way of overview and introduction, this invention concerns a device for weaning an addiction, which, in the exemplary embodiment, is discussed in connection with breaking a smoking habit. The device is reactive to user requests. In response to a user request, permissions are selectively granted to the user, allowing the user to engage in the habit that is being weaned, in this example, smoking. The time period between permissions gradually increases with "successful" actuations from a (preferably, prescribed) initial wait period. The device does not proactively notify the user when it is time to smoke again; instead, the user must do something to the device in order to request permission to smoke again. The device is always in one of two states during normal operation: it can indicate that the user has to wait additional time for a permission, which is the wait state, or it can indicate that it is o.k. to smoke, which is the armed state. This approach provides an elegant solution to weaning a habit because, if the user does not actuate the device as soon as the device has changed to the armed state, the user will not be notified of the fact that it is now permissible to smoke. Instead, the user will go for an additional, undefined time period without being made aware that a successful request could be made. Thus, the user "discovers" that the device 100 was in the armed state when the urge to smoke or otherwise engage in a habit arises. Once in the armed state, the moment that the user actuates the device, it will grant permission immediately and enter the next wait state. Critically, the wait interval between such successful requests progressively increases to further the weaning process.

Figure 1:
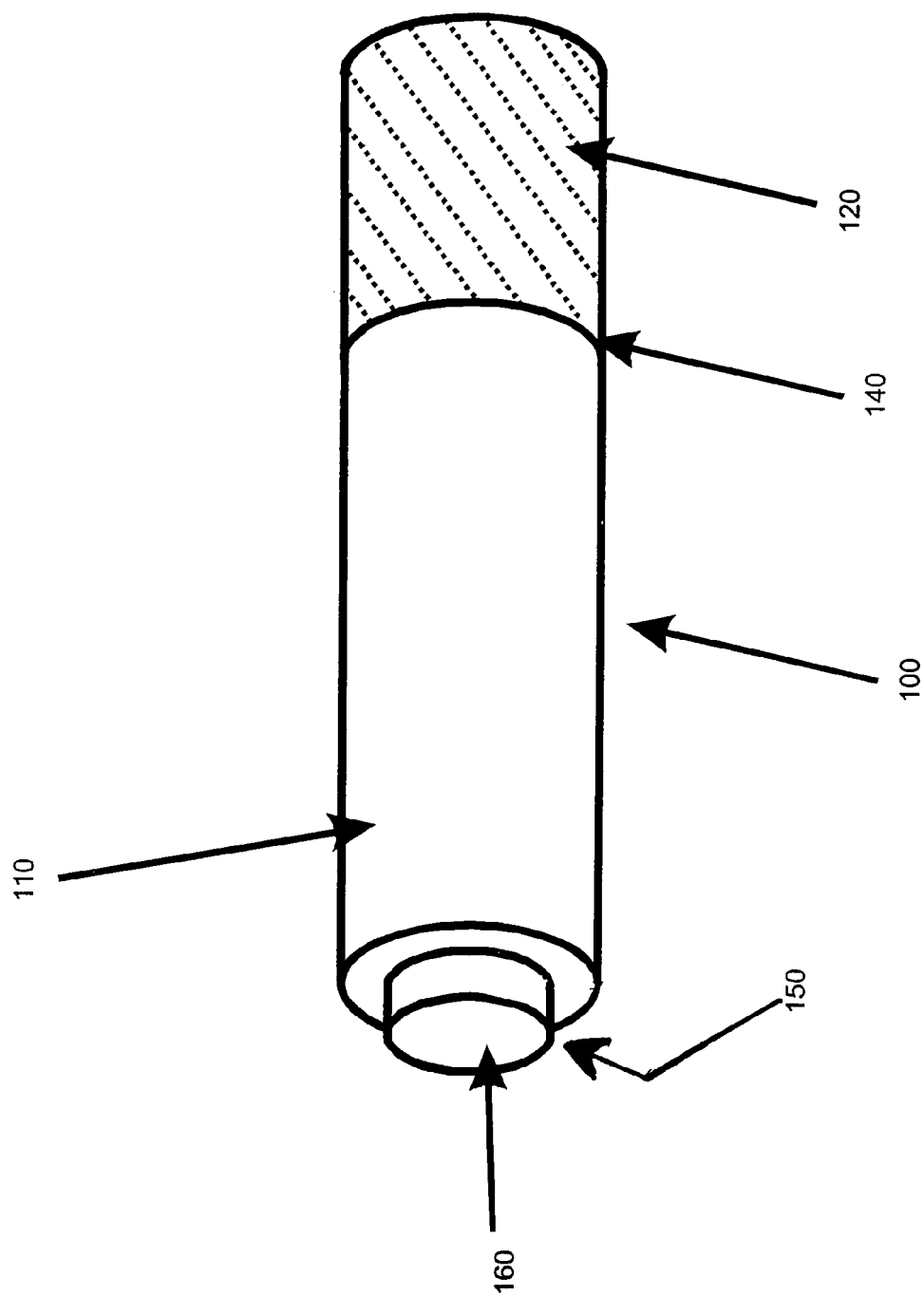
FIG. 1 is a diagram of a preferred embodiment of the present invention.

Referring now to FIG. 1, an embodiment of the invention is shown which is designed to help wean a smoking habit. The illustrated housing 110 has a cylindrical form, the interior not being shown. One end 120 is preferably attached to the housing 110 by a threaded or other connection 140 which allows the end 120 to be removed for battery replacement, and, optionally, to reset or change settings of the device 100. In this embodiment, the end 120 is adorned to resemble the end of cigarette, such as the filter end of a cigarette. So, visually, the illustrated device 100 insinuates a cigarette and handling a so-constructed device provides a degree of psychological comfort to the user; however, the appearance of the device 100 is not important to the invention.

An actuator 150 is also provided which, in this embodiment, is a button that protrudes from one end of the housing 110. The actuator is pressed to close a circuit contained within the housing. The user of the device 100 presses the actuator 150 to seek permission to engage in the habit being weaned. The actuator can be a capacitive or inductive switch, if desired, and can be positioned elsewhere on the house 110.

The indicator 160 preferably comprises an LED. The indicator advises the user whether the device 100 is in a wait state or armed state in response to requests that are accepted by the device 100 using the actuator 150 as an input device.

The actuator 150 preferably supports and contains, at least partially the indicator 160. When the actuator 150 is pushed, the user can clearly and quickly be informed of the state of the device 100. The LED can be positioned elsewhere. Other examples of the indicator can be an electroluminescent device, a light bulb, a buzzer, a flashing display of an icon, or a vibrator. Regardless of the indicator type, when the actuator 150 is pressed, the wait state and armed state are distinguished. In the preferred embodiment, the indicator is a flashing LED so that the user knows that the device 100 is working and the battery is functioning.

Other forms for the housing can be used if desired. For example, the housing 110' can comprise a watch casing with the actuator 150' comprising a button protruding from the case and the indicator 160' being positioned on the face of the watch. Another form can be that of a pager in which the actuator button 150' comprises a button on the pager and the indicator 160' is part of the standard display panel (or is the pager's vibrator). Yet another example is a Personal Information Manager (PIM) or Personal Digital Assistant (PDA) in which the actuator comprises a keyboard button or touch-sensitive icon on the display panel and in which the standard display panel serves as the indicator 160'.

Figure 2:
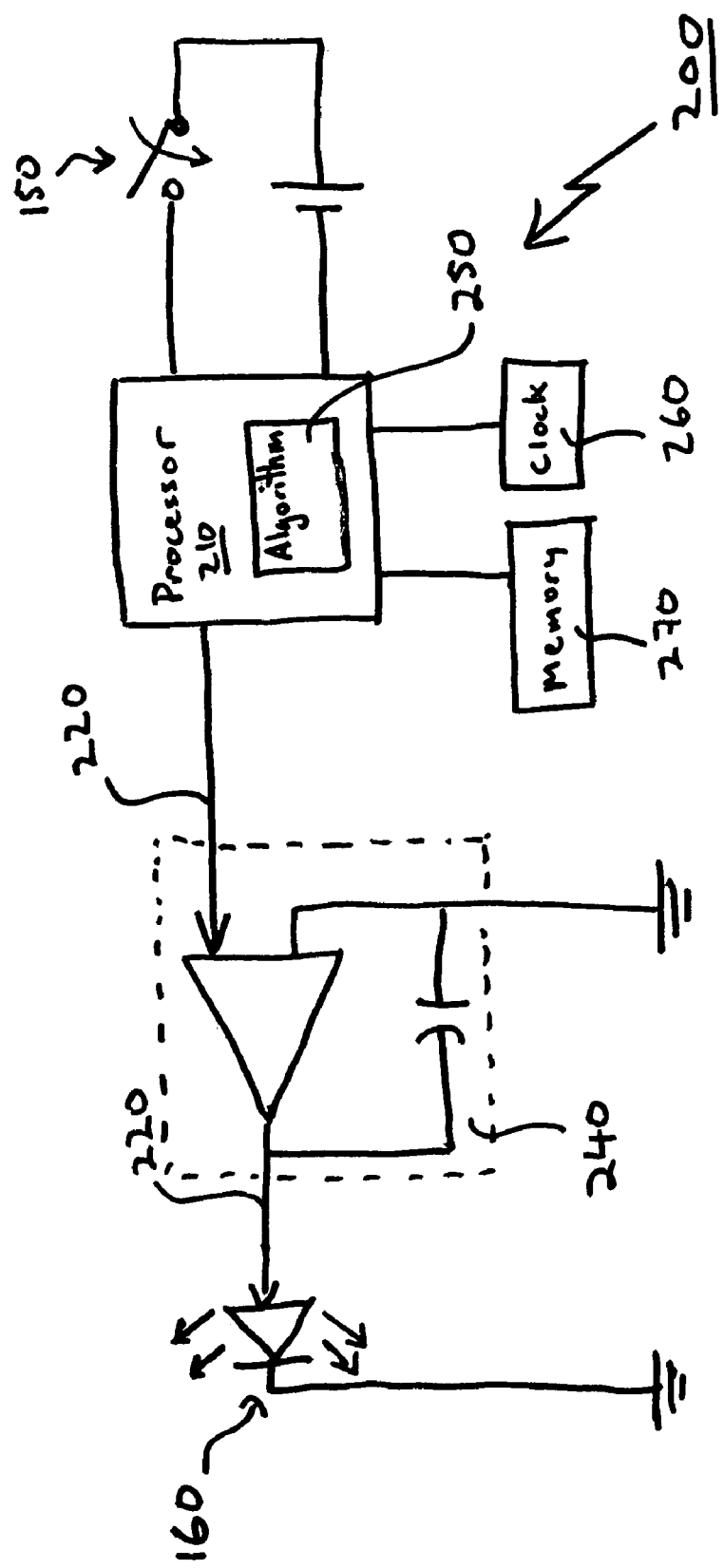
FIG. 2 is a block diagram of a circuit useful with the preferred embodiment.

FIG. 2 illustrates the circuit details of a governor circuit 200 that can be contained within the housing 200. A processor 210 delivers a state signal 220 to the actuator 160 when the actuator 150 is pressed. A clock 260 delivers to the processor 210 a timing signal indicative of that time since the last wait state was initiated ($T_n$). A wait state is initiated in response to a user pressing the actuator 150 when the device 100 is in an armed state. The timing signal can be obtained by other means such as a crystal oscillator, 555 timer circuit, an RC timing circuit or through an embedded timer or software included on-board the processor 210 itself. The memory 270 is used by the processor to store the current value of the wait state, or the threshold value ($t_n$). The threshold value of this embodiment changes with every subsequent wait state, in accordance with the invention, to progressively wean the addictions by increasing successive wait intervals. Optionally, the memory can also store configuration settings for the device 100 and also data concerning the number of attempted actuations by a user while the device was still in the wait state. Such data can be used to control the transition (i.e., the time of the change over) to the armed state. An algorithm 250 is executed by the processor 210 and governs the comparison between the current threshold value ($T_n$) stored in memory 270 and the current elapsed time ($T_n$) from the clock 260. If the current threshold value ($t_n$) is greater than the elapsed time value ($T_n$), the difference is the amount of time still required in order for the device to enter the armed state.

The processor will deliver a wait state signal 220 to the indicator 160 if the actuator 150 is pressed and if the algorithm determined that the timing signal does not yet satisfy the threshold value. On the other hand, if the elapsed time value ($T_n$) satisfies (that is, exceeds or equals the current threshold value ($t_n$), the difference in time is the amount of time that the user lost to have been able to smoke ($l_n$), but the processor will deliver an armed state signal 220 to the actuator under control of the algorithm 250. When the elapsed time value exceeds the current threshold value, the lost time is referred to herein as lapsed time ($l_n$). Lapsed time is the amount of time that the device 100 has been in an active state and the user would have been permissioned to smoke if the actuator 150 had been pressed. The time left and the time lost will generally not be shown to the user, but can be retained in a memory 270 (optionally together with the algorithm) for statistical purposes utilized by the governor circuit 200.

The processor 210 also uses the algorithm 250 to increment the wait state's current threshold value $t_n$. The threshold value is increased each time a new wait state is triggered $T_n$ while the device 100 is already in an armed state. An incremental increase in the current threshold value is used to slowly increase the intervals at which a user can smoke, and therefore weans the user of the addiction over time.

In this embodiment, the processor 210 uses the same algorithm 250 for both the function of determining whether to deliver the state signal and for updating the threshold valve. In addition, the timing signal is reset so that the newly computed current threshold value is compared against a new timing signal starting with the moment that a successful activation has been made (that is, a press of the actuator 150 that was made while the device is in the armed state).

The device is either in a wait state or in an armed state, depending on timing issues as described below. Different indications are provided to the user in response to pressing the actuator 150, as a function of the present state of the device 100. While in the wait state, there may be no indication at all, or the indication may be a flashing light. However, while in the armed state, a steady light can be the indication to the user. No matter how many times the button 150 is pushed in the wait state, there is preferably no effect on the duration of the waiting state or advancement/delay of the next armed state. Other configurations are possible in which the user is penalized with a longer wait for "unsuccessful" button presses.

In the illustrated embodiment, the processor delivers the wait state signal 220 such that the indicator 160 displays a flashing light. The armed state signal 220 can comprise a steady output at the indicator 160. Optionally, an amplifier circuit 240 is provided to boost the state a signal to a voltage magnitude sufficient to drive the selected indicator device. The amplifier can be on-board the processor 210.

FIG. 3 is a timing and state diagram which illustrates the algorithm of the exemplary embodiment. In this diagram, the current value for the amount of time necessary to satisfy the wait state is indicated by $t_n$ and is called the current threshold value. The time period during which the threshold value is not exceeded is called the wait state 330, and each subsequent wait state is indicated by a letter (e.g. 330a, 330b, wherein the designation for the first wait state is 330a). Once the current threshold value has been exceeded, the device 100 enters into an Armed State 340, and each subsequent armed state is indicated by a letter (340a, 340b, etc.). Depending on the present state of the device, presses of the activator 150 have different results. Presses 310 of the button 150 while the device 100 is in the Wait State 330 are indicated differently in the diagram from presses 320 of the button 150 while the device 100 is in the Armed State 340. When the urge arises, a user presses 310 the button 150 to get permission, say, to smoke. If the device 100 is in the wait state, the indicator 160 will indicate to the user that it is not yet time (e.g. by doing nothing or by blinking, etc.). When the user presses 320 the button 150 when the device 100 is in an armed state, however, the user gets a different indication than when the device was in the wait state (e.g., a steady light for 1 second). Further, because the elapsed time has satisfied the algorithm 250, that activation causes a triggering event which places the device in the next wait state with (optionally) a new timing signal starting from that moment. Each subsequent press 320 of the button 150 while in the Armed State is indicated on the diagram as event $T_n$, which indicates a successful actuation that delivers a permission to the user and starts a new wait state $t_{n+1}$.

The initial start time is indicated by $T_0$, which is that time at which the user pushed the button 150 for the first time on the device 100 and was permitted to smoke a cigarette. The device 100 enters into a wait state 330$a$ for a duration of the first (current) threshold value $t_1$. Since the device 100 does not indicate to the user the current state, the user presses the activator 150 at various times 310 to learn if the next cigarette is allowed. The device indicates back to the user that it is still in a wait state 330$a$ and the user must wait to smoke a cigarette. The device 100 will be in that wait state 330$a$ until the timing signal from the clock has arrived at the (current) threshold value $t_1$. At that time, the device 100 will enter the armed state 340$a$. When the user next presses the activator 150 he or she shall discover a permission has been issued by virtue of the processor delivering the state signal indicative of the armed time.

Once the threshold value $t_1$ has been exceeded, the device 100 goes into an armed state 340$a$, during which the elapsed time $l_1$ is lost until the user presses the button 150 indicated by 320$a$. Since the device 100 is passive and does not affirmatively alert the user to the fact that it is already in an armed state 340$a$ and is ready to grant permission to engage in the habit being weaned, that elapsed time $l_1$ defines a window during which the user could have had another cigarette. In this circumstance, the device 100 does not trigger a new state $T_{n+1}$ until the user has depressed the button 150. Therefore, there will be a time period for which the user loses the ability to smoke forever, indicated in FIG. 3 by $l_1$, $l_2$ and $l_3$. The elapsed time $l_n$ can be very extremely small, e.g., if the user presses the button 150 at the moment the device 100 exceeds the threshold value $t_n$ and goes into the armed state 340$a$, 340$b$ or 340$c$.

At time $t_{1+}l_1$, the user has just pressed 320$a$ the button 150 while the device 100 was in the armed state 340$a$. As a result, the device 100 enters the wait state 330$b$ for a duration of $t_2$. The current threshold time duration $t_2$ is calculated using the algorithm 250 in the processor 210 by taking the previous threshold time duration value $t_1$ and incrementing it by incremental value $D_n$. $D_n$ is a predetermined percentage increase value that will assist the user in slowly weaning the cigarette habit. Preferably, the percentage increase is small so that it is reasonable for the user to slowly get acclimated to the fewer number of cigarettes being smoked over time. It is anticipated that the device will be able to assist a 4-pack-a-day cigarette smoker wean down to 1-cigarette-a-day during, say, a 5-month period. The percentage rate increase is given as an example, there could be different permutations of incremental value $D_n$ available in different devices 100 or it could be a configurable, different predetermined increment.

After the time duration for threshold value $t_2$ has been reached, the device 100 again enters the next armed state 340$b$ and waits for the user to press 320$b$ the button 150. The threshold value $t_2$, and more generally, $t_{n+1}$, is larger than the prior threshold period. This cycle continues. When the user presses 320$b$ the button 150 while the device 100 is in the armed state 340$b$, the device 100 enters the wait state 330$c$ for a duration of $t_3$. Once again, the next threshold time duration $t_3$ is be calculated using the algorithm 250 by taking the previous threshold time duration value $t_2$ and incrementing it by incremental value $D_n$. After the time duration for threshold value $t_3$ has been reached, the device 100 enters the next armed state 340$c$ and waits for the user to press 320$c$ the button 150, until which time the elapsed time $l_3$ indicates the time lost in which the user could have smoked had the user known.

As a result, the increase in the current threshold value has a compounding effect on the magnitude of the timing signal that is necessary to deliver an Armed State signal.

The invention can be embodied other than described in the foregoing detailed description and is defined solely by the claims appended hereto.

I claim:

1. A device for weaning an addiction such as a smoking habit, comprising:
   a housing;
   an indicator;
   a processor configured to deliver a state signal to the indicator under control of an algorithm, the state signal being indicative of one of an armed state and a wait state;
   a timing signal that changes value in time;
   a manually actuatable actuator supported by the housing and communicatively coupled to the processor to selectively reset the timing signal;
   wherein in response to manual actuation of the actuator, the algorithm (1) delivers the state signal indicative of the wait state until the timing signal satisfies a threshold value and (2) delivers the state signal indicative of the armed state, resets the timing signal, and increases the threshold value after the timing signal satisfies the threshold value.

2. The device of claim 1, wherein the indicator is a light emitting diode (LED) and wherein the state signal indicative of the armed state comprises a voltage pulse of a magnitude sufficient to drive the LED.

3. The device of claim 2, further comprising:
   an amplifier connected between the processor and the indicator, wherein the amplifier amplifies the state signal delivered by the processor to the magnitude sufficient to drive the LED.

4. The device of claim 3, wherein the amplifier is on-board the processor.

5. The device of claim 1, wherein the actuator comprises a button that is depressible by a user.

6. The device of claim 5, wherein the indicator is supported by and contained at least partially within the button.

7. The device of claim 6, wherein the indicator is a light emitting diode.

8. The device of claim 1, wherein the housing is cylindrical and has the appearance of a cigarette.

9. The device of claim 1, wherein the housing is a watch case having a face and wherein the indicator is disposed on one of the case and the face.

10. The device of claim 1, wherein the housing includes a pager having a display panel and wherein the indicator is the display panel.

11. The device of claim 1, wherein the threshold value is increased by a predetermined amount with each activation of the activator, which has been made once the timing signal satisfies the threshold value.

12. The device of claim 1, wherein the predetermined amount is a percentage increase.

13. The device of claim 12, wherein each percentage increase of the threshold value has a compounding effect on the magnitude of the timing signal necessary to deliver the state signal indicative of the armed state.

14. The device of claim 1, wherein the timing signal is generated by the processor.

15. The device of claim 1, further comprising a clock configured to deliver the timing signal to the algorithm for comparison to the threshold value.

16. The device of claim 1, further comprising a memory for storing the threshold value.

17. The device of claim 1, wherein the algorithm is stored in the memory.

18. The device of claim 1, wherein the armed state comprises a selected one of a steady signal delivered to the indicator and an intermittent signal delivered to the indicator.

19. The device of claim 18, wherein the wait state comprises the unselected one of the steady and the intermittent signals.

20. A method for weaning an addiction such as a smoking habit comprising the steps of:

providing an electronic governor, the governor including an algorithm that compoundingly increases an interval between permissions granted to a user;

enabling the user to seek permission from the governor by manually activating an activator associated with the governor; and in response to any manual activation of the activator, selectively indicating permission to the user to satisfy the addiction in the event that the interval since the last indicated permission exceeds the compoundingly increased interval.

* * * * *